US012713095B2

(12) United States Patent
Deng

(10) Patent No.: US 12,713,095 B2
(45) Date of Patent: Aug. 18, 2026

(54) APPARATUS, COMPUTER-READABLE MEDIUM, AND METHOD FOR CHANNEL CHANGE DETECTION-BASED SHORT CONTENT IDENTIFICATION

(71) Applicant: The Nielsen Company (US), LLC, New York, NY (US)

(72) Inventor: Kevin Keqiang Deng, Safety Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 19/021,812

(22) Filed: Jan. 15, 2025

(65) Prior Publication Data

US 2025/0168447 A1 May 22, 2025

Related U.S. Application Data

(63) Continuation of application No. 18/443,212, filed on Feb. 15, 2024, now Pat. No. 12,256,122, which is a continuation of application No. 17/875,161, filed on Jul. 27, 2022, now Pat. No. 11,936,945.

(60) Provisional application No. 63/284,593, filed on Nov. 30, 2021.

(51) Int. Cl.
*H04N 21/442* (2011.01)
*H04N 21/438* (2011.01)
*H04N 21/439* (2011.01)
*H04N 21/466* (2011.01)

(52) U.S. Cl.
CPC ... *H04N 21/44204* (2013.01); *H04N 21/4383* (2013.01); *H04N 21/4394* (2013.01); *H04N 21/4666* (2013.01)

(58) Field of Classification Search
CPC ......... H04N 21/44204; H04N 21/4383; H04N 21/4394; H04N 21/4666
See application file for complete search history.

(56) References Cited

U.S. PATENT DOCUMENTS 7,725,919 B1 * 5/2010 Thiagarajan ............ H04N 7/16

* cited by examiner

*Primary Examiner* — Anthony Bantamoi

(57) ABSTRACT

Methods, apparatus, systems, and articles of manufacture are disclosed that improve short content identification in an audio stream through channel change detection and audio block realignment. Example instructions cause one or more processors to form a first audio block from an audio stream, detect whether the first audio block contains a channel change, the first audio block being one of a plurality of audio blocks the accessed audio, determine an offset of time from a beginning of the first audio block to when the channel change occurs in response to the channel change being detected in the first audio block, and create a new audio block aligned to start at the offset of time beyond the beginning of the first audio block using audio information from the audio stream, the new audio block to include a single channel of audio stream data.

20 Claims, 10 Drawing Sheets

APPARATUS, COMPUTER-READABLE MEDIUM, AND METHOD FOR CHANNEL CHANGE DETECTION-BASED SHORT CONTENT IDENTIFICATION

CROSS REFERENCE TO RELATED APPLICATIONS

This disclosure is a continuation of U.S. patent application Ser. No. 18/443,212, filed Feb. 15, 2024, which is a continuation of U.S. patent application Ser. No. 17/875,161, now U.S. Pat. No. 11,936,945, filed Jul. 27, 2022, and which claims priority to U.S. Provisional Patent Application No. 63/284,593, filed on Nov. 30, 2021, each of which is hereby incorporated by reference herein in its entireties.

FIELD OF THE DISCLOSURE

This disclosure relates generally to audio streams and, more particularly, detecting audio channel changes and extracting audio watermark information out of audio streams.

BACKGROUND

Audio information can be streamed to devices for listening or other purposes. The stream can be a pure audio stream or it can be a portion of a video stream. Users listen to the stream of audio data on devices. Currently, there is an immense amount of content to receive and listen to (and view in the case of video). Users regularly have many choices of the types of content to receive across a number of channels and it is common to change channels regularly to browse through many different streams. Audio data in each channel has a unique audio signature and audio code that certain hardware and/or software can extract to provide additional information related to the audio content in a given channel's stream.

Figure 1:
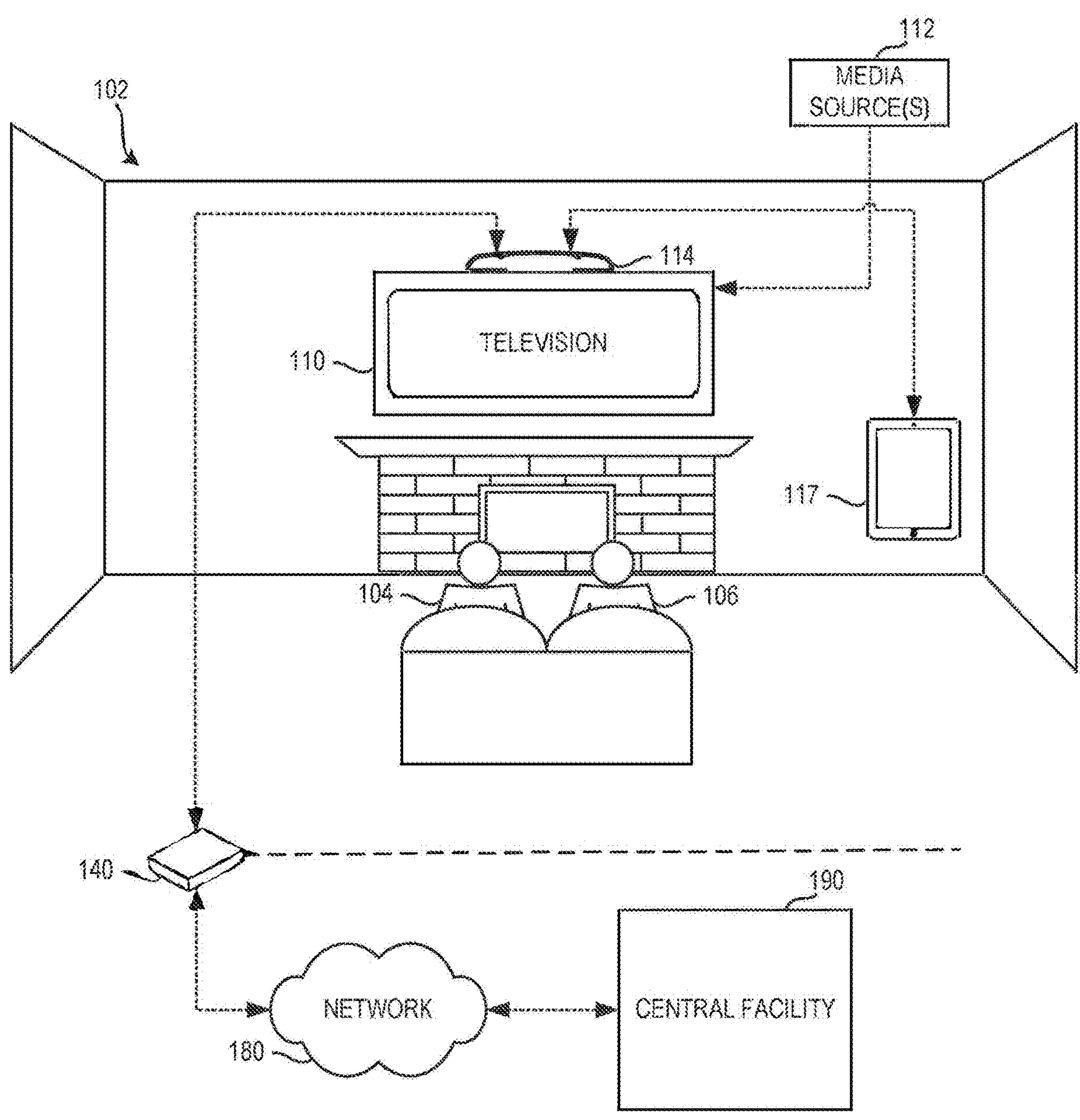
FIG. 1 is an illustration of an example audience measurement system constructed in accordance with the teachings of this disclosure to perform channel change detection-based short content identification.

The figures are not to scale.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

There are a number of companies that monitor the media that people listen to and watch. The media monitoring industry monitors the media that the public consumes for a number of reasons, such as to determine what content is popular, what time of day people watch and listen, what content is popular with what demographics. This information is important to media producing companies to adapt and stay relevant with their user base as well as to maximize ad revenue around the content, among other reasons. The media monitoring companies desire accurate data per user that they monitor.

The streamed media usually includes streamed audio and video. Streamed audio can be segmented into audio blocks of data. A series of these blocks can store the information from an audio stream. The information from the audio stream can include raw audio data as well as other forms of data, such as audio watermarks that can include audio codes and audio signatures. In certain situations, an accurate representation of what someone is listening to and/or watching is desired. When an audio block portion of the audio stream has a channel change during the length of time in the audio block, extracting an audio code or an audio signature from that audio block becomes problematic because the information from two channels of audio is contained within a single audio block, which can lead to inaccurate (or no) audio code and/or audio signature representations of the audio block.

It is common for people that watch and listen to streamed media channels (e.g., television channels, online videos channels, music channels, etc.) to browse through several channels in a relatively short period of time. Sometimes this is referred to as channel surfing. When this happens, a channel may be presented (e.g., displayed visually, played audibly, etc.) on a media device for less than the time of an audio block length of time. It is desirable to accurately identify channel content when it is presented on the media device even for a short period of time as well as to accurately identify the content from the beginning of a period of time when the content is presented to the end of that period of time. This allows an accurate indication of what channel was being presented on the media device at any time, regardless of when channel changes occurred in relation to the beginning and end of audio blocks of the audio data. Therefore, a channel change detection short content identification process is described below. The examples described focus on audio channels. These channels can be part of an audio stream for television or video channels (such as broadcast television channels, cable television channels, internet streaming video channels, etc.) or as pure audio content (such as broadcast radio channels, satellite radio channels, internet-based audio channels, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

FIG. 1 is an illustration of an example audience measurement system constructed in accordance with the teachings of this disclosure to perform channel change detection-based short content identification. In the illustrated example of FIG. 1, an example media presentation environment 102 includes example panelists 104, 106, an example media presentation device 110 that receives media from an example media source 112, and an example meter 114. The meter 114 identifies the media presented by the media presentation device 110 and reports media monitoring information to an example central facility 190 of an example audience measurement entity via an example gateway 140 and an example network 180.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In the illustrated example of FIG. 1, the media presentation device 110 is in communication with an audio/video receiver 118. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed in the media presentation environment 102. In some examples, the meter 114 is installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, configuring the meter 114 to transmit media monitoring information via the example gateway 140, etc. In examples disclosed herein, configuration of the meter 114 is performed by an installer (e.g., personnel from the audience measurement entity) who installs the meter 114 in the media presentation environment 102 and configures the meter 114.

The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media.

In examples disclosed herein, to monitor media presented by the media presentation device 110, the meter 114 of the illustrated example senses audio (e.g., acoustic signals or ambient audio) output (e.g., emitted) by the media presentation device 110 and/or some other audio presenting system (e.g., an audio/video receiver). For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes an example audio sensor (e.g., a microphone). In some examples, the meter 114 may process audio signals obtained from the media presentation device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be compiled with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

Using configuration information (e.g., a name of a WiFi network, credentials for accessing the WiFi network, etc.), the meter 114 of the illustrated example communicates with a remotely located central facility 190 of the audience measurement entity. In the illustrated example of FIG. 1, the example meter 114 communicates with the central facility 190 via a gateway 140 and a network 180. The example metering device 114 of FIG. 1 sends media identification data and/or audience identification data to the central facility 190 periodically, a-periodically and/or upon request by the central facility 190.

The example gateway 140 of the illustrated example of FIG. 1 is a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc., to transmit and/or receive data via the Internet. Alternatively, the gateway 140 may be coupled to such a LAN. In examples disclosed herein, the example gateway 140 and/or connectivity to the Internet via the gateway 140 is provided by the panelists 104, 106. That is, the example gateway 140 is a device that is owned and/or operated by the panelists 104, 106, and is not provided by the audience measurement entity. In some examples, the example gateway 140 may be provided by an Internet Service Provider (ISP) to facilitate communication between the LAN provided by the gateway 140 and the network 180 (e.g., the Internet). In examples disclosed herein, the meter 114 utilizes the LAN hosted by the example gateway 140 to transmit information to the central facility 190. Transmitting information using a LAN provided by the example gateway 140 ensures that information is reliably transmitted to the central facility 190. Advantageously, other costlier approaches to transmitting information to the central facility 190 such as, for example, inclusion of a cellular transceiver in the meter 114, need not be utilized.

The network 180 of the illustrated example is a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation such as, for example, on a side of the media presentation device 110, on the bottom of the media presentation device 110, and/or may not be affixed to the media presentation device 110. For example, the meter 114 may be placed in a location near the media presentation device 110.

Figure 2:
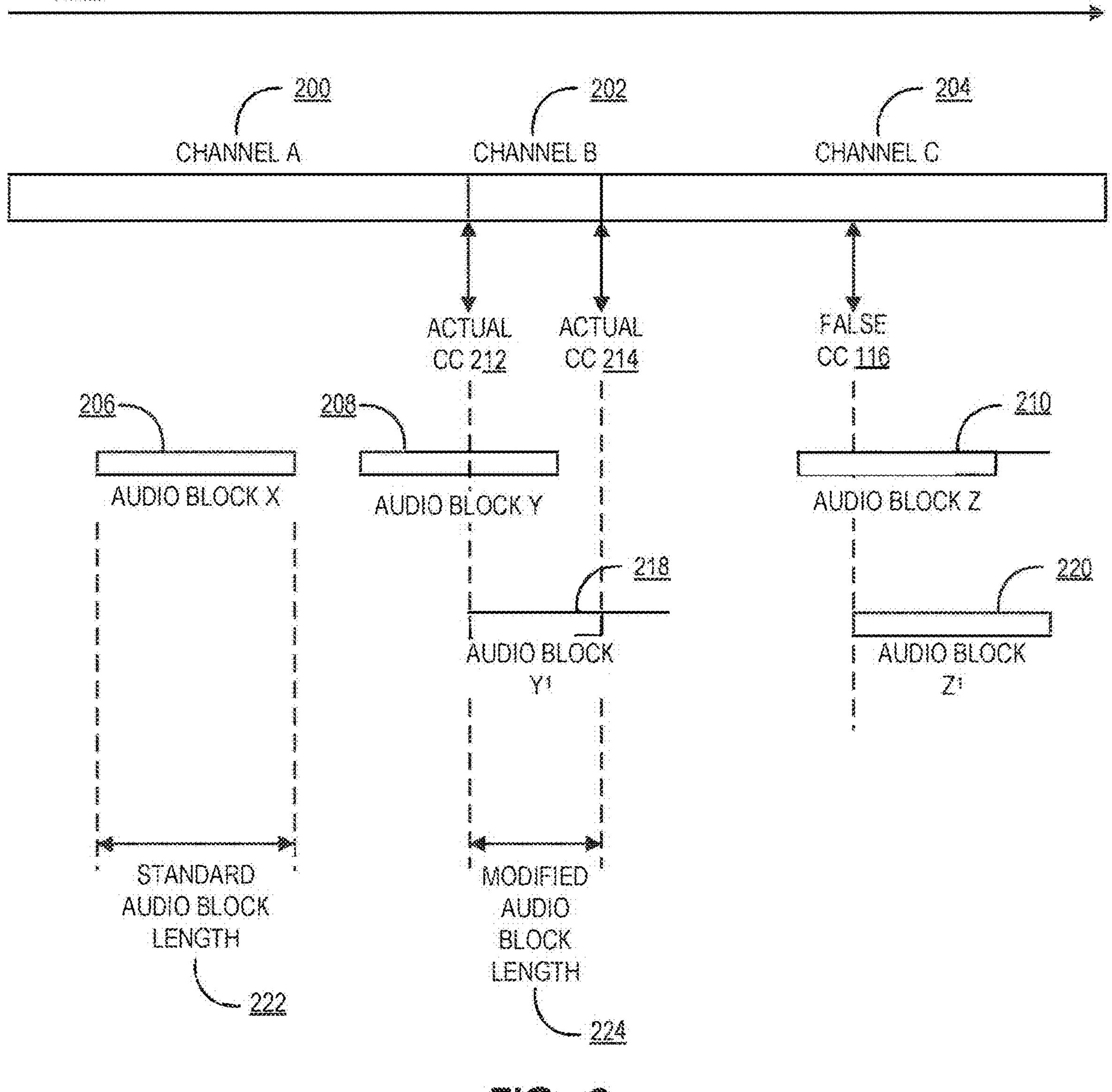
FIG. 2 is an illustrative example of the realignment audio blocks from an audio stream to coincide with channel changes.

In some examples, the circuitry that performs the process discussed below in the description related to FIG. 2 is an audio stream analyzing (ASA) circuitry (e.g., 324 in FIG. 3). In some examples, the audio stream analyzing circuitry 324 is located in the meter 114. In other examples, the audio stream analyzing circuitry 324 is located in media presentation device 110. In yet other examples, the audio stream analyzing circuitry 324 is located in another device that is communicatively coupled to one or more devices with access to the audio stream to be processed, such as gateway 140 or configuration device 117, among other locations. Further detail regarding the audio stream analyzing circuitry 324 is disclosed in connection with FIG. 3, including information regarding additional circuitry within the audio stream analyzing circuitry 324, including an audio stream block formation circuitry 302, a raw audio block buffer circuitry 304, a neural network channel change detector circuitry 306, a neural network channel change model circuitry 308, an audio block creator circuitry 314, an aligned audio block buffer circuitry 316, and a code and signature identification circuitry 318).

FIG. 2 is an illustrative example of the realignment audio blocks from an audio stream to coincide with channel changes. In the illustrated example in FIG. 2, a stream of audio content is shown that includes audio content (e.g., data) from one or more channels (e.g., video/television channels). In different examples, television channels may include broadcast (over-the-air) channels, cable or fiber channels, internet streaming channels, among others. In different examples, the audio content includes audio in one of a number of audio formats (INPUT AUDIO FORMAT EXAMPLES). As shown in the illustrated example, the audio content changes as the channels change from Channel A (200) to Channel B (202) to Channel C (204).

Figure 3:
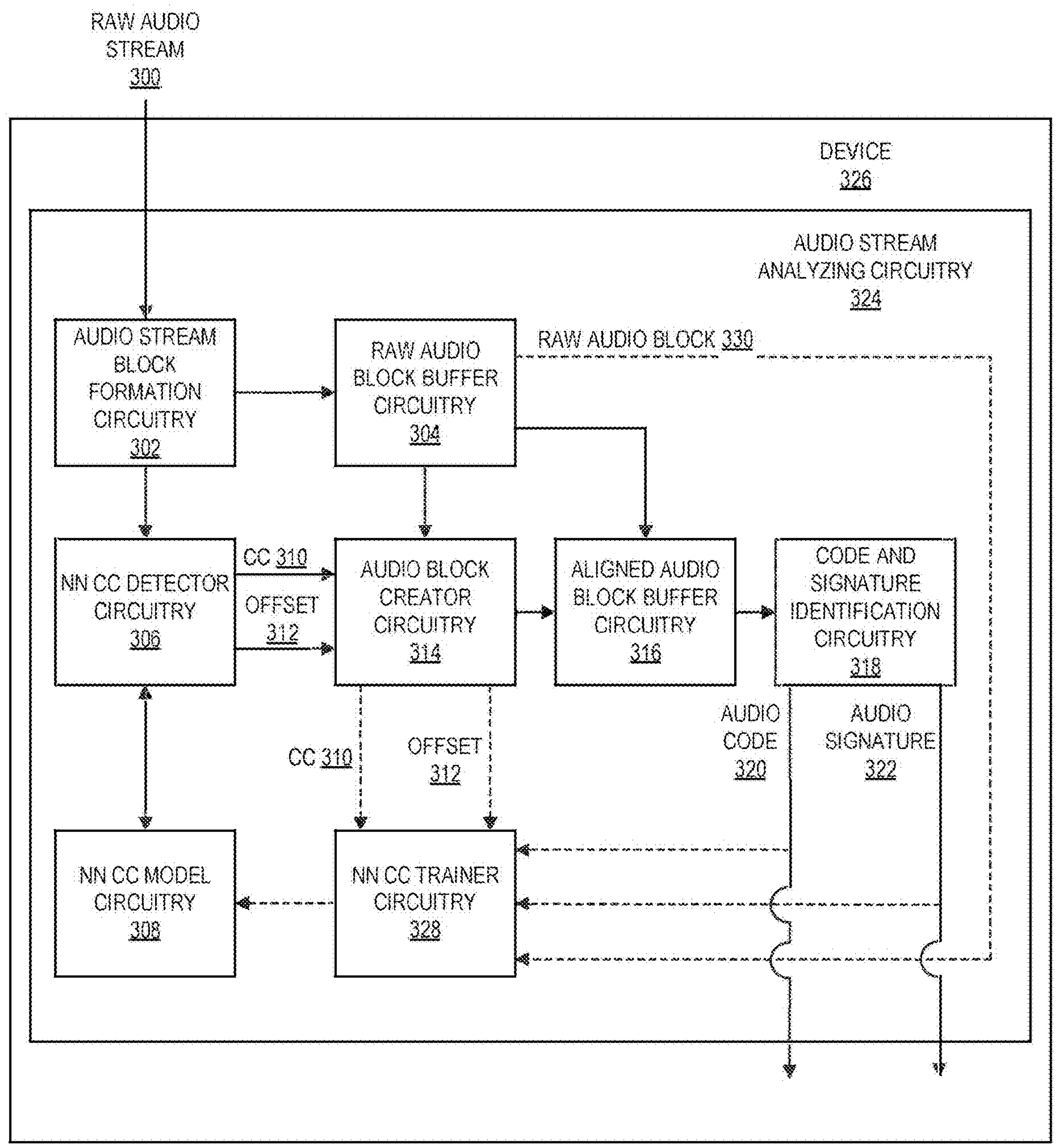
FIG. 3 is a schematic illustration of example circuitry to identify short content through channel change detection.

In some examples, the circuitry that performs the process described in FIG. 2 is an audio stream analyzing (ASA) circuitry 324 in FIG. 3. Further detail regarding the audio stream analyzing circuitry 324 is disclosed in connection with FIG. 3 (e.g., the audio stream block formation circuitry 302, the raw audio block buffer circuitry 304, the NN CC detector circuitry 306, the NN CC model circuitry 308, the audio block creator circuitry 314, the aligned audio block buffer circuitry 316, and the code and signature identification circuitry 318).

Returning to the illustrated example in FIG. 2, when a channel changes, there is an actual channel change that takes place where the audio stream changes from the audio data that is a portion of the channel A (200) stream to the audio data that is a portion of the channel B (202) stream. In some examples, there is a defined actual channel change (CC) 212 signifying the change in audio streams. Additionally, in some examples, there is another defined actual CC 214 signifying the change in audio streams from channel B (202) to channel C (204).

In some examples, an artificial neural network (NN) learns to detect channel changes based on a set of changes in the data of the stream at the time of each channel change. Thus, the NN has the capability to observe data in the stream and based on certain types of changes to the data over time, determines whether a channel change has taken place. In some examples, neural networks are trained and learn with data to become more accurate at making such determinations. While trained neural networks may be relatively accurate at making determinations, the determinations are usually not fool-proof and have the potential to report erroneous channel changes. In the illustrated example, a false channel change 216 is shown in the middle of the time channel C (204) is streaming. In the illustrated example, the neural network makes the determination as to when channel changes happen and reported a false channel change when one did not take place. Further detail regarding the NN is disclosed in connection with FIG. 3 (e.g., the NN CC model circuitry 308).

In the illustrated example, the audio stream is shown as bars directly below the names of the channels A-C (200-204) and is made up of audio data. In some examples, other types of data as well may be integrated with the audio data (e.g., metadata, etc.). In some examples, one or more audio blocks are generated that are portions (e.g., snippets) of time within the channel audio stream. In some examples, the stream is received in an audio block format from a remote system or broadcaster. In other examples, the received stream includes raw audio data or other audio data types that are not segmented into blocks. In some examples, hardware circuitry and/or software parses/segments the stream into blocks as it is received (e.g., forms audio blocks from the received raw audio stream).

In the illustrated example, the audio blocks created from the stream include audio block X (206), audio block Y (208), and audio block Z (210). In some examples, an audio block has a standard length format (e.g., a standard length of time from the beginning of the block to the end—the standard audio block length 222). In some examples, the audio stream analyzing circuitry 324 that creates the blocks does so without regard to channel changes. Thus, as an audio stream is received, the stream is segmented into audio block of the standard audio block length 222.

In the illustrated example, only three audio blocks (e.g., a plurality of audio blocks) are shown to simplify the explanation, though it should be understood that in many examples many more audio blocks are present that are segmented from the audio stream. In some examples, the audio stream that is shown from channel A-C (200-204) is made up of a series of audio blocks that are segmented one right after the next to contain the entire amount of audio data (e.g., audio information) from the audio stream.

In some examples, an audio block of a standard audio block length 222 is created that spans a channel change. For example, FIG. 2 illustrates audio block Y (208) spanning the actual channel change 212.

In some examples, the audio stream, and more specifically the audio block created from the audio stream data, include one or more audio codes and audio signatures. In some examples, audio stream analyzing circuitry 324 that identifies an audio code or an audio signature from audio data does so using the entire audio block amount of data, from the start to the finish of the audio block (e.g., the standard audio block length 222).

In some examples, when the audio signature is identified from audio block X (206), the identified audio signature will match channel A (200) because the entire audio block X (206) contains data only from channel A (200). Additionally, in some examples, when the audio signature is identified from audio block Z (210), the identified audio signature will match channel C (204) because the entire audio block Z (210) contains data only from channel C (204). Similarly, the example audio codes from audio block X (206) and audio block Z (210) will be available for use after extraction because the audio blocks X (206) and Z (210) contain data only from their respective channels A (200) and C (204), respectively.

In some examples, the audio codes and signatures change with a change in the channel being streamed because each channel has unique data, which corresponds to unique audio codes and audio signatures. Thus, in contrast to the identified audio signatures and codes from audio blocks X (206) and Z (210), in some examples, issues arise when attempting to identify the audio signature and audio code from audio block Y (208). In the illustrated example, audio block Y (208) contains audio data from both channels A (200) and B (202), which causes the codes from channels A (200) and B (202) to interfere with each other. In some examples, codes interfering with each other cause the audio stream analyzing circuitry 324 extracting the audio code to fail to obtain a valid code and the code for audio block Y (208) is lost.

Additionally, the audio signature identified from audio block Y (208) includes a signature from audio data across the entire length of the audio block Y (208). Therefore, because the signature identified from audio block Y (208) is a combination of a portion of the channel A (200) signature and the channel B (202) signature, the identified signature will not match either signature.

To remedy this issue, in the illustrated example, audio stream analyzing circuitry 324 utilizes the neural network that detects channel changes to determine time(s) of channel changes and then creates new audio blocks that are adjusted through realignment to the channel changes that have been detected. In the illustrated example, audio stream analyzing circuitry 324 marks the time of each determined channel change, such as actual channel changes 212 and 214 and creates audio blocks that start at the time of each of these channel changes. In some examples, creating audio blocks that start at the time of a channel change remove issues associated with identifying audio signature and audio code data from an audio block because the alignment removes a channel change from the audio block. In some examples, the neural network provides the audio stream analyzing circuitry 324 an indication of a channel change (e.g., a flag bit or other communicated information) and an offset into the original audio block that is the time of the channel change (e.g., to mark channel changes such as CCs 212 and 214).

In the illustrated example, the portion of audio data that was contained in audio block Y (208) after the actual channel change 212 is utilized to create the start of audio block Y1 (i.e., Y-prime) (218). In some examples, "created" audio blocks for realignment are created using the audio stream data (e.g., from one or more audio blocks received) and are created at the length of a standard audio block length 222 when there is (i.e., in response to there being) enough room for the audio block to be a standard length before a next channel change.

In some examples, if two channel changes take place in succession in a timeframe that is less than the standard audio block length 222, then the audio stream analyzing circuitry 324 makes an exception to creating a standard length audio block by creating an audio block with a modified audio block length 224 to assure no channel change occurs in the newly created audio block. For example, as shown in FIG. 2, audio block Y-prime 218 is of a shorter modified audio block length 224 to start at actual channel change 212 and end at the next actual channel change 214.

In some examples, the remainder of the audio data in audio block Y-prime 218 past the end of the data in audio block Y 208 is retrieved from a next audio block originally created and placed directly after audio block Y 208. In these examples, the audio data from this next audio block past audio block Y 208 is used to create the later portion of audio block Y-prime 218 up until the next actual channel change 214. In some examples, a next new audio block is created starting at the next actual channel change 214 to capture channel C 204 information starting at the next actual channel change 214.

In the illustrated example, the neural network makes a mistake and determines (erroneously) that there is a channel change at the false channel change 216 time. In some examples, the realignment audio stream analyzing circuitry 324 is directed to create the audio block Z-prime 220 because of the false channel change 216. Although, the realignment of the audio stream information to start at the audio block Z-prime start is not needed, the realignment does not materially change the identification of the audio code and audio signature in audio block Z-prime for channel C 204.

FIG. 3 is a schematic illustration of example circuitry to identify short content through channel change detection.

In some examples, device 326 of the illustrated example shown in FIG. 3 is a device that monitors media and may be communicatively coupled to a display device, such monitor 114 in FIG. 1. In other examples, device 326 is a display device, such as media presentation device 117 in FIG. 1. In some examples, the device 326 is capable of directly presenting media (e.g., via a display) while, in other examples, the device 326 presents the media on separate media presentation equipment (e.g., speakers, a display, etc.). Thus, as used herein "media devices" may or may not be able to present media without assistance from a second device. Media devices are typically consumer electronics. For example, the device 326 of the illustrated example is a personal computer such as a laptop computer, and thus, is capable of directly presenting media (e.g., via an integrated and/or connected display and speakers). While in the illustrated example, a personal computer is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

In different examples, the audio stream analyzing circuitry 324 and/or the circuitry blocks within the audio stream analyzing circuitry 324 (e.g., the audio stream block formation circuitry 302, the raw audio block buffer circuitry 304, the NN CC detector circuitry 306, the NN CC model circuitry 308, the audio block creator circuitry 314, the aligned audio block buffer circuitry 316, the code and signature identification circuitry 318, and the NN CC trainer circuitry 328) may be circuitry/hardware logic in a central processing unit (CPU), a graphics processor unit (GPU), a fixed programmable gate array (FPGA), an application specific integrated circuit (ASIC), or any one or more other types of circuitry gate logic. In some examples, the circuitry may have dedicated hardware logic designed specifically to perform the functions described. In other examples, the circuitry may have general purpose hardware logic that runs software/firmware designed to perform the functions described. In yet other examples, the circuitry may include a combination of dedicated and/or general purpose hardware as well as dedicated and/or general purpose software/firmware in a combination to perform the functions described.

In the illustrated example, a raw audio stream 300 is received by audio stream block formation circuitry 302. In some examples, the audio stream block formation circuitry 302 receives a raw audio stream in one or more audio formats and forms (e.g., creates) a series of audio blocks that represent the audio stream in segmented sections. In other examples, the audio stream received is already segmented into an audio block format and the audio stream block formation circuitry 302 simply passes the audio blocks through to the remainder of the system.

In the illustrated example, the audio stream block formation circuitry 302 stores the audio blocks that are created/formed (or received) into a raw audio block buffer circuitry 304. In some examples, the raw audio block buffer circuitry 304 is a memory to store the raw audio blocks. The audio blocks are referred to as "raw" because they are formed from the raw stream without any form of modification or alignment (as of yet), thus, they are described as raw audio blocks that are made up of the raw stream of audio data. In some examples, the memory may be a dynamic random access memory (DRAM), a non-volatile memory (NVM), a cache (e.g., L1, L2, L3, etc.), a solid-state drive (SSD), a hardware storage buffer in one or more processors, or any other form of memory that is capable of storing data.

In the illustrated example, the audio stream block formation circuitry 302 additionally provides the raw audio block buffer data to the neural network channel change detector circuitry 306. In some examples, the neural network channel change detector circuitry 306 is a neural network running on the system or across a series/group of systems that performs channel change detection on the audio blocks.

In some examples, the apparatus includes means for forming a first audio block from an audio stream, means for detecting whether the first audio block contains a channel change, the first audio block being one of a plurality of audio blocks the accessed in an audio stream, means for determining an offset of time from a beginning of the first audio block to when the channel change occurs in response to the channel change being detected in the first audio block, means for creating a new audio block aligned to start at the offset of time beyond the beginning of the first audio block, means for identifying an audio code and/or an audio signature from the new audio block, and means for sending training data (at least including an audio block that has a channel change and an offset of time into the audio block when the channel change occurs) to the neural network model to train the neural network to detect channel changes. For example, the means for forming a first audio block from an audio stream, discussed above, may be implemented by audio stream block formation circuitry 302. In some examples, the audio stream block formation circuitry 302 may be implemented by machine executable instructions such as that implemented by at least block 500 in FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the audio stream block formation circuitry 302 is implemented by other hardware logic circuitry, hardware implemented state machines, and/or any other combination of hardware, software, and/or firmware. For example, the audio stream block formation circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example, the neural network channel change detector circuitry 306 accesses a neural network channel change model circuitry 308 that stores the model trained to recognize channel changes in audio blocks. A detailed description of training the model is discussed below in reference to FIG. 6. In some examples, neural network channel change detector circuitry 306 supplies/feeds the neural network channel change model circuitry 308 the audio blocks that have been formed (e.g., created) and the model returns information that corresponds to a determination of whether a channel change is detected for each individual audio block. If a channel change is detected, then the neural network channel change detector circuitry 306 retrieves the channel change information/data from the model that includes the indicator of the channel change (CC 310) and an offset of time (offset 312) into the audio block from the beginning that indicates the time the channel change was detected.

In the illustrated example, the neural network channel change detector circuitry 306 sends the channel change indicator 310 and the offset 312 to an audio block creator circuitry 314. In some examples, the raw audio block buffer circuitry 304 stores only a most recent audio block received from the audio stream block formation circuitry 302. In these examples, the audio block creator circuitry 314 retrieves the most recent audio block stored (e.g., the only audio block stored) in the raw audio block buffer circuitry 304. In other examples, the raw audio block buffer circuitry 304 is a first-in-first-out (FIFO) buffer. In yet other examples, the raw audio block buffer circuitry 304 is another type of buffer and each audio block includes an identification. In these examples, the neural network channel change detector circuitry 306 sends the identification of the specific audio block to the audio block creator circuitry 314 with the channel change indicator 310.

In some examples, the apparatus includes means for forming a first audio block from an audio stream, means for detecting whether the first audio block contains a channel change, the first audio block being one of a plurality of audio blocks the accessed in an audio stream, means for determining an offset of time from a beginning of the first audio block to when the channel change occurs in response to the channel change being detected in the first audio block, means for creating a new audio block aligned to start at the offset of time beyond the beginning of the first audio block, means for identifying an audio code and/or an audio signature from the new audio block, and means for sending training data (at least including an audio block that has a channel change and an offset of time into the audio block when the channel change occurs) to the neural network model to train the neural network to detect channel changes. For example, the means for detecting whether the first audio block contains a channel change and the means for determining an offset of time from a beginning of the first audio block to when the channel change occurs in response to the channel change being detected in the first audio block, discussed above, may be implemented by the neural network channel change detector circuitry 306. In some examples, the neural network channel change detector circuitry 306 may be implemented by machine executable instructions such as that implemented by at least blocks 400 and 402 in FIG. 4 and blocks 502, 504, 506, and 508 in FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the neural network channel change detector circuitry 306 is implemented by other hardware logic circuitry, hardware implemented state machines, and/or any other combination of hardware, software, and/or firmware. For example, the neural network channel change detector circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audio block creator circuitry 314, in response to receiving the channel change indicator 310, accesses the audio block (i.e., the current/original audio block) with the channel change indicated from the raw audio block buffer circuitry 304. In some examples, the audio block creator circuitry 314 then creates a new audio block starting at the offset 312 in time beyond the start of the current audio block using the audio stream data/content from the current audio block. If a second channel change occurs in the audio stream (either also in the current audio block or in a next audio block from the raw audio block buffer circuitry 304) then the example audio block creator circuitry 314 creates the new audio block with a length equal to the time from the first channel change to the second channel change (e.g., audio block Y-prime 218 in FIG. 2). If a second channel change does not occur before the end of a standard length of an audio block (e.g., standard audio block length 222 in FIG. 2), then the example audio block creator circuitry 314 creates the new audio block with a standard audio block length 222.

In some examples, the apparatus includes means for forming a first audio block from an audio stream, means for detecting whether the first audio block contains a channel change, the first audio block being one of a plurality of audio blocks the accessed in an audio stream, means for determining an offset of time from a beginning of the first audio block to when the channel change occurs in response to the channel change being detected in the first audio block, means for creating a new audio block aligned to start at the offset of time beyond the beginning of the first audio block, means for identifying an audio code and/or an audio signature from the new audio block, and means for sending training data (at least including an audio block that has a channel change and an offset of time into the audio block when the channel change occurs) to the neural network model to train the neural network to detect channel changes. For example, the means for creating a new audio block aligned to start at the offset of time beyond the beginning of the first audio block, discussed above, may be implemented by the audio block creator circuitry 314. In some examples, the audio block creator circuitry 314 may be implemented by machine executable instructions such as that implemented by at least blocks 404 in FIG. 4 and blocks 510 and 512 in FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the audio block creator circuitry 314 is implemented by other hardware logic circuitry, hardware implemented state machines, and/or any other combination of hardware, software, and/or firmware. For example, the audio block creator circuitry 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example, the audio block creator circuitry 314 sends the newly created audio block to an aligned audio block buffer circuitry 316. In some examples, the aligned audio block buffer circuitry 316 is a memory to store the aligned audio blocks. In some examples, the memory may be a dynamic random access memory (DRAM), a non-volatile memory (NVM), a cache (e.g., L1, L2, L3, etc.), a solid-state drive (SSD), a hardware storage buffer in one or more processors, or any other form of memory that is capable of storing data.

The audio blocks are referred to as "aligned" because at least some of them are created to align to channel changes that occur in the raw stream. In some examples, the raw audio blocks stored in the raw audio block buffer circuitry 304 that do not have any detected occurrences of channel changes in them can be passed on from the raw audio block buffer circuitry 304 to the aligned audio block buffer circuitry 316. In some examples, the audio block creator circuitry 314 can send both raw and aligned audio blocks, as necessary, to the aligned audio block buffer circuitry 316. Thus, in these examples, the audio blocks stored in the aligned audio block buffer circuitry 316 are a combination of raw and aligned audio blocks, but there are not any detected channel changes in them (i.e., all channel changes have occurred at the boundaries of audio blocks, not at some distance into an audio block past its beginning).

In the illustrated example, a code and signature identification circuitry 318 has access to the audio blocks stored in the aligned audio block buffer circuitry 316. In some examples, the code and signature identification circuitry 318 extracts an audio code 320 and/or identifies an audio signature 322 from one or more audio blocks stored in the aligned audio block buffer circuitry 316 and provides them as needed to other logic/circuitry for utilization.

In some examples, the apparatus includes means for forming a first audio block from an audio stream, means for detecting whether the first audio block contains a channel change, the first audio block being one of a plurality of audio blocks the accessed in an audio stream, means for determining an offset of time from a beginning of the first audio block to when the channel change occurs in response to the channel change being detected in the first audio block, means for creating a new audio block aligned to start at the offset of time beyond the beginning of the first audio block, means for identifying an audio code and/or an audio signature from the new audio block, and means for sending training data (at least including an audio block that has a channel change and an offset of time into the audio block when the channel change occurs) to the neural network model to train the neural network to detect channel changes. For example, the means for creating a new audio block aligned to start at the offset of time beyond the beginning of the first audio block, discussed above, may be implemented by the audio block creator circuitry 314. In some examples, the audio block creator circuitry 314 may be implemented by machine executable instructions such as that implemented by at least blocks 404 in FIG. 4 and blocks 510 and 512 in FIG. 5 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the audio block creator circuitry 314 is implemented by other hardware logic circuitry, hardware implemented state machines, and/or any other combination of hardware, software, and/or firmware. For example, the audio block creator circuitry 314 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example, the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, the code and signature identification circuitry 318, and the neural network channel change trainer circuitry 328 are all portions of audio stream analyzing circuitry 324 within a device 326. In other examples, one or more of the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, and the code and signature identification circuitry 318 are located external to the audio stream analyzing circuitry 324 but still within the device 326. In yet other examples, one or more of the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, and the code and signature identification circuitry 318 are located external to the device 326. In some examples, of the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, and the code and signature identification circuitry 318 are not all on the same device and instead are instantiated across multiple devices in the cloud or across a network.

In some examples, the audio stream analyzing circuitry 324 is a device other than a media device, such as an analysis workstation or server that retrieves statistics of audio codes 320 and/or audio signatures 322 without playing the audio content/data (e.g., media) on the same device.

In the illustrated example in FIG. 3, additional circuitry is included to train the channel change detection model to increase the accuracy of channel change detection. In some examples, a neural network channel change trainer circuitry 328 receives (raw) audio block information 330 from the raw audio block buffer circuitry 304. In some examples, the audio block creator circuitry 314 provides the channel change indicator 310 and the offset data 312 to the neural network channel change trainer circuitry 328. In some examples, the code and signature identification circuitry provides the audio code 320 and/or the audio signature 322 to the neural network channel change trainer circuitry 328. More specifically, the data provided to the neural network channel change trainer circuitry includes a set of information that can be used to train the channel change detection model to become more accurate and detect channel changes with greater accuracy.

For example, providing a raw audio block (330), an indication that there is a detected channel change in the raw audio block (310), and the offset location (312) into the raw audio block the channel change was detected can be used to train the model with existing detected channel changes. Additionally, providing one or more audio codes (320) and/or one or more audio signatures (322) across blocks with multiple channels can be used to verify the channel change was detected correctly (e.g., the original raw audio block may have an inconclusive audio code and/or audio signature with blended information across multiple channels, but the audio code 320 and/or the audio signature 322 can be used to show that after creating new audio blocks, precise audio codes 320 and/or audio signatures 322 are verifiable.

In the illustrated example in FIG. 3, the neural network channel change trainer circuitry 328 then uses the received data (e.g., one or more of the raw audio block 330, the channel change indicator 310, the offset location 312, the audio code(s) 320, and/or the audio signature(s) 322) to train the model stored in the neural network channel change model circuitry 308 to increase its determinative accuracy of detecting channel changes.

In the illustrated example in FIG. 3, the data transferred between blocks for training purposes are shown with dashed lines for distinction.

In some examples, the apparatus includes means for forming a first audio block from an audio stream, means for detecting whether the first audio block contains a channel change, the first audio block being one of a plurality of audio blocks the accessed in an audio stream, means for determining an offset of time from a beginning of the first audio block to when the channel change occurs in response to the channel change being detected in the first audio block, means for creating a new audio block aligned to start at the offset of time beyond the beginning of the first audio block, means for identifying an audio code and/or an audio signature from the new audio block, and means for sending training data (at least including an audio block that has a channel change and an offset of time into the audio block when the channel change occurs) to the neural network model to train the neural network to detect channel changes. For example, the means for sending training data (at least including an audio block that has a channel change and an offset of time into the audio block when the channel change occurs) to the neural network model to train the neural network to detect channel changes, discussed above, may be implemented by NN CC trainer circuitry 328. In some examples, the NN CC trainer circuitry 328 may be implemented by machine executable instructions such as that implemented by at least blocks 600 and 602 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the NN CC trainer circuitry 328 is implemented by other hardware logic circuitry, hardware implemented state machines, and/or any other combination of hardware, software, and/or firmware. For example, the NN CC trainer circuitry 328 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audio stream analyzing circuitry 324 is illustrated in FIG. 3, one or more of the elements, processes, and/or devices illustrated in FIG. 3 may be combined, divided, re-arranged, omitted, eliminated, and/or implemented in any other way. Further, the example audio stream block formation circuitry 302, the raw audio block buffer circuitry 304, the NN CC detector circuitry 306, the NN CC model circuitry 308, the audio block creator circuitry 314, the aligned audio block buffer circuitry 316, the code and signature identification circuitry 318, the NN CC training circuitry 328, and/or more specifically, the audio stream analyzing circuitry 324 of FIG. 3 may be implemented by hardware alone or by hardware in combination with software and/or firmware. Thus, for example, any of the example audio stream analyzing circuitry 324, and/or more specifically, the example audio stream block formation circuitry 302, the example raw audio block buffer circuitry 304, the example NN CC detector circuitry 306, the example NN CC model circuitry 308, the example audio block creator circuitry 314, the example aligned audio block buffer circuitry 316, the example code and signature identification circuitry 318, and example the NN CC training circuitry 328, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device (s) (PLD(s)), and/or field programmable logic device(s) (FPLD(s)) such as Field Programmable Gate Arrays (FPGAs). Further still, the example audio stream analyzing circuitry 324, and more specifically, the example audio stream block formation circuitry 302, the example raw audio block buffer circuitry 304, the example NN CC detector circuitry 306, the example NN CC model circuitry 308, the example audio block creator circuitry 314, the example aligned audio block buffer circuitry 316, the example code and signature identification circuitry 318, and the example NN CC training circuitry 328, may include one or more elements, processes, and/or devices in addition to, or instead of, those illustrated in FIG. 3, and/or may include more than one of any or all of the illustrated elements, processes and devices.

Figure 4:
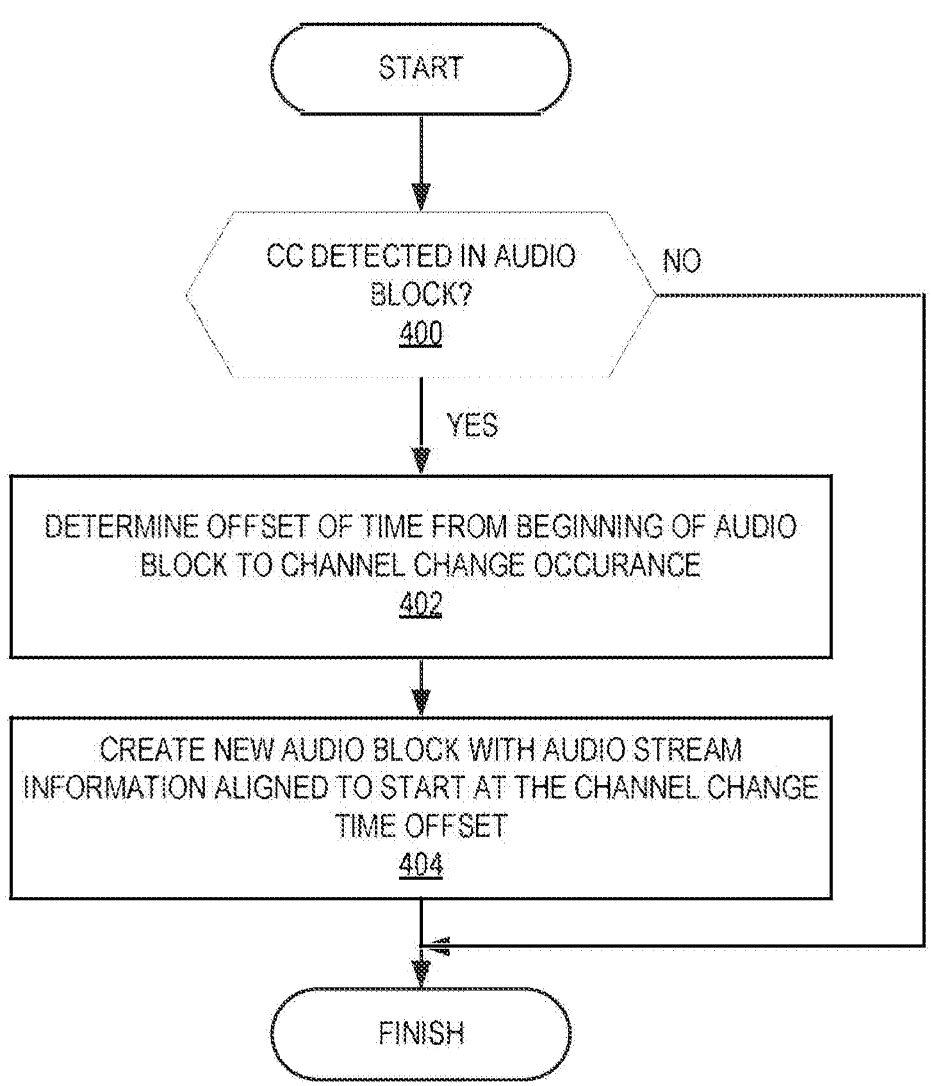
FIG. 4 is a flowchart representative of example machine readable instructions that may be executed by example processor circuitry to implement channel change detection-based short content identification.
Figure 5:
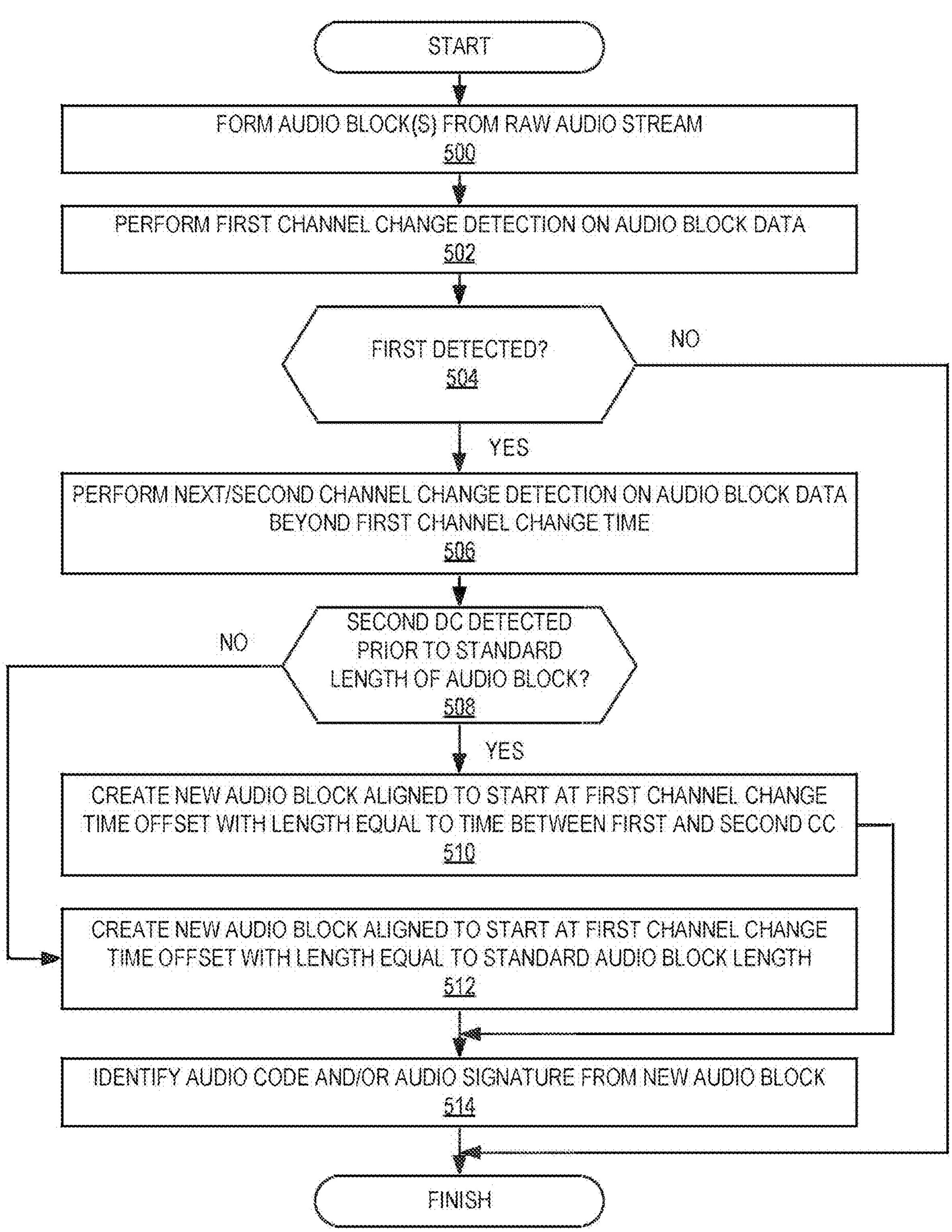
FIG. 5 is another flowchart representative of example machine readable instructions that may be executed by example processor circuitry to implement channel change detection-based short content identification.
Figure 6:
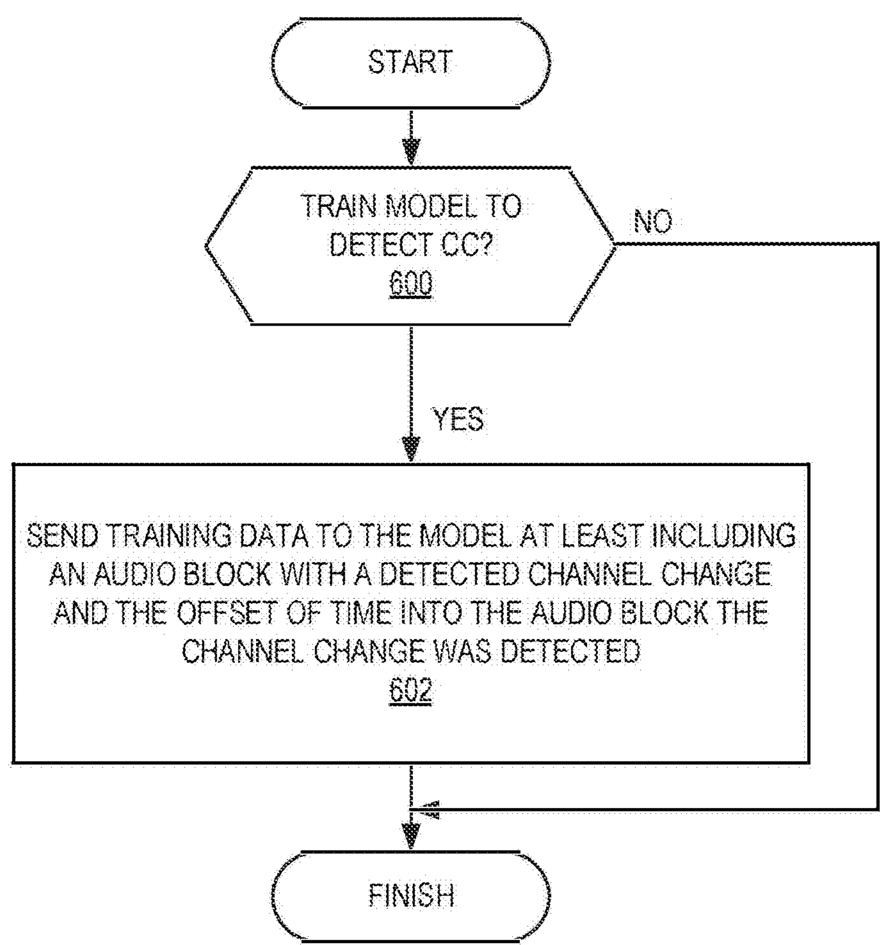
FIG. 6 is a flowchart representative of example machine readable instructions that may be executed by example processor circuitry to implement the training of a neural network channel change detection model.

Flowcharts representative of example hardware logic circuitry, machine readable instructions, hardware implemented state machines, and/or any combination thereof for implementing the example audio stream analyzing circuitry 324 are shown in FIGS. 4-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The programs may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-6, many other methods of implementing the example audio stream analyzing circuitry 324 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions that may be executed by example processor circuitry to implement channel change detection-based short content identification.

The example instructions of FIG. 4 are described in connection with example audio stream analyzing circuitry 324 of FIGS. 3 and 7. In some examples, the process flow is performed by one or more of the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, the code and signature identification circuitry 318, and the NN CC training circuitry 328 of FIGS. 3 and 7.

In the illustrated example of FIG. 4, when an audio block (e.g., a raw audio block containing audio data) from an audio stream is available to be checked for a channel change, the process begins. At block 400, the example audio stream analyzing circuitry 324 determines whether a channel change has been detected in an audio block.

If a channel change has not been detected, then the process ends.

If a channel change has been detected, then, at block 402, the audio stream analyzing circuitry 324 determines an offset of time from the beginning of the audio block to the point in the audio block where the channel change has occurred.

At block 404, the audio stream analyzer circuitry 324 then creates a new audio block with information from the audio stream (e.g., information/data from at least the current raw audio block) and aligns the new audio block to start at the channel change time offset.

FIG. 5 is another flowchart representative of example machine readable instructions that may be executed by example processor circuitry to implement channel change detection-based short content identification.

The example instructions of FIG. 5 are described in connection with example audio stream analyzing circuitry 324 of FIGS. 3 and 7. In some examples, the process flow is performed by one or more of the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, the code and signature identification circuitry 318, and the neural network channel change training circuitry 328 of FIGS. 3 and 7.

In the illustrated example of FIG. 5, when an audio stream with raw audio data is available (e.g., the audio stream analyzing circuitry 324 receives the audio stream, the process begins.

At block 500, the example audio stream analyzing circuitry 324 forms one or more audio blocks (e.g., raw audio blocks) from the raw audio stream data.

At block 502, the example audio stream analyzing circuitry 324 performs a first channel change detection on the audio block data (e.g., the audio block formed from process flow block 500).

At block 504, the example audio stream analyzing circuitry 324 determines whether the first channel change has been detected in the raw audio block.

If a channel change has not been detected, then the process ends.

If a channel change has been detected in the audio block, then, at block 506, the example audio stream analyzing circuitry 324 performs a second channel change (e.g., a next channel change) detection on the audio block data beyond the first channel change time. In some examples, the second/next channel change may occur in a next raw audio block representing audio data from the audio stream at a time immediately after the end of the first raw audio block.

At block 508, the example audio stream analyzing circuitry 324 determines whether the second channel change has been detected in the audio block data prior to the standard length of an audio block.

If a second channel change has been detected prior to the standard length of an audio block past the first channel change, then at block 510, the example audio stream analyzing circuitry 324 creates a new audio block aligned to start at the first channel change time offset with a length equal to the time between the first and second channel change in the audio stream. In some examples, the new audio block is created using a portion of audio data from the first raw audio block and a portion of audio data from one or more other additional raw audio blocks that are part of the audio stream after the first raw audio block.

If a second channel change has not been detected prior to the standard length of an audio block past the first channel change, then at block 512, the example audio stream analyzing circuitry 324 creates a new audio block aligned to start at the first channel change time offset with a length equal to the standard audio block length. Again, in some examples, the new audio block is created using a portion of audio data from the first raw audio block and a portion of audio data from one or more other additional raw audio blocks that are part of the audio stream after the first raw audio block.

Once the new audio block has been created using either the process flow described in block 510 or in block 512, then, at block 514, the example audio stream analyzing circuitry 324 identifies an audio code and/or an audio signature from the new audio block. At this point the process ends.

FIG. 6 is a flowchart representative of example machine readable instructions that may be executed by example processor circuitry to implement the training of a neural network channel change detection model.

The example instructions of FIG. 6 are described in connection with example audio stream analyzing circuitry 324 of FIGS. 3 and 7. In some examples, the process flow is performed by one or more of the audio stream block formation circuitry 302, the raw audio buffer circuitry 304, the neural network channel change detector circuitry 306, the neural network channel change model circuitry 308, the audio block creator circuitry 314, the aligned audio block buffer circuitry 316, the code and signature identification circuitry 318, and the neural network channel change training circuitry 328 of FIGS. 3 and 7.

In the illustrated example of FIG. 6, the training process begins at block 600 when the example audio stream analyzing circuitry 324 determines if the neural network model is designated to be trained. In some examples, training can happen dynamically as data (e.g., the channel change indicator 310, the offset location 312, and the raw audio block 330) are received from the respective blocks in the audio stream analyzing circuitry 324 (e.g., the raw audio block 330 received from the audio stream block formation circuitry 302 through the raw audio block buffer circuitry 304 and/or the channel change indicator 310 and the offset location 312 received from the audio block creator circuitry 314). In other examples, training can happen after a set period of time has elapsed and a significant amount of channel change detection results have occurred.

Once the training is started/initiated, the audio stream analyzing circuitry 324, then at block 602, the audio stream analyzing circuitry 324 sends training data to the model at least including an audio block (e.g., raw audio block 330) with a detected channel change and the offset of time into the audio block (e.g., the chronological location in the audio block) that the channel change was detected. In some examples, the channel change indicator 310 is also sent to train the model. In some examples, one or more audio codes 320 and/or audio signatures 322 are also sent to train the model. In some examples, the process completes. In other examples, if a significant amount of data from multiple audio blocks and channel changes are sent to train the model, the process in FIG. 6 can repeat as many times as needed. At this point the process ends. FIG. 7 is a block diagram of an example processor platform 700 structured to execute and/or instantiate the machine readable instructions and/or operations of FIGS. 4-6 to implement the apparatus of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the audio stream analyzing circuitry 324 of FIG. 3.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

Machine executable instructions 732, which may be implemented by the machine readable instructions of FIGS. 4-6, may be stored in the mass storage device 728, in the volatile memory 714, in the non-volatile memory 716, and/or on a removable non-transitory computer readable storage medium such as a CD or DVD.

Figure 7:
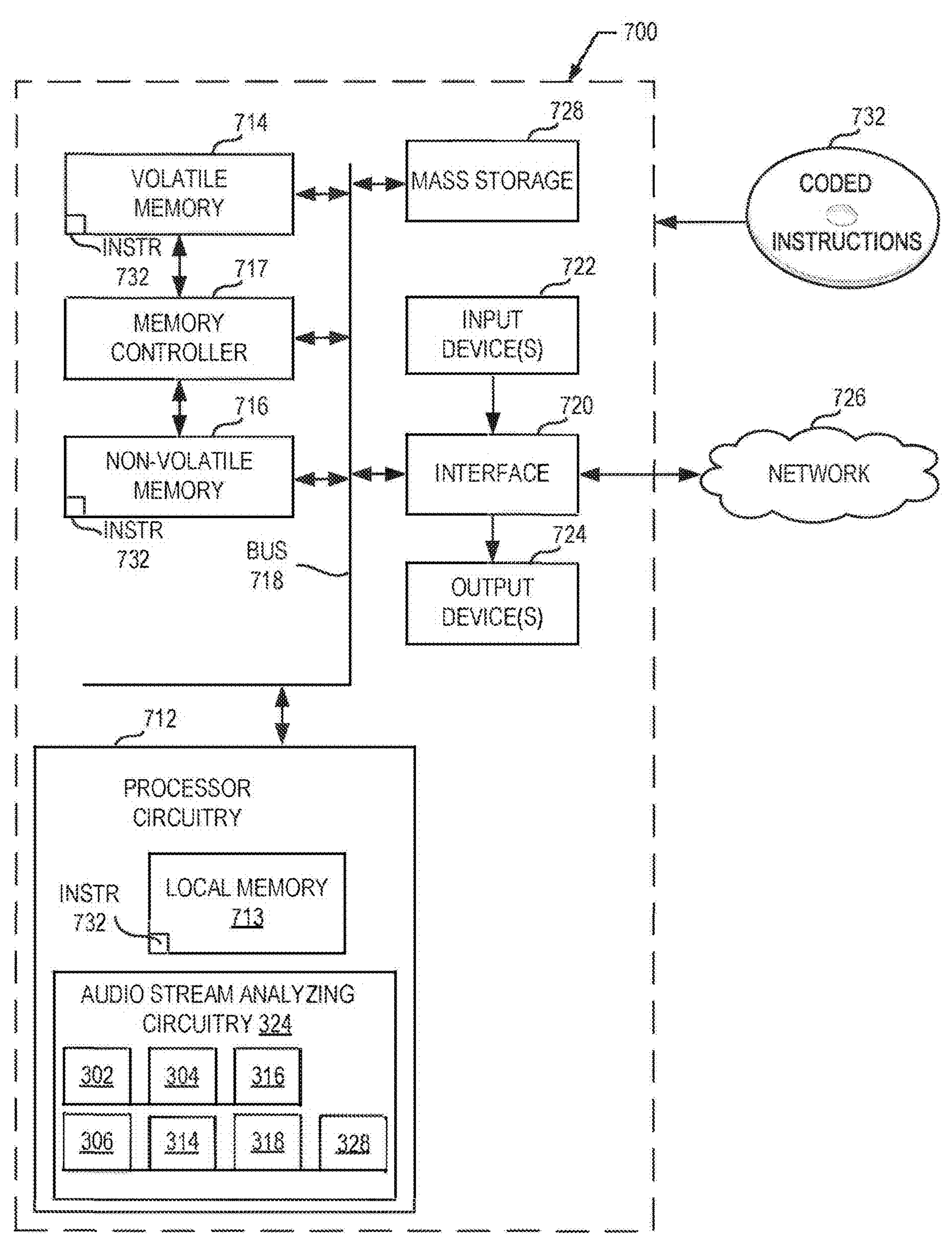
FIG. 7 is a block diagram of an example processing platform including processor circuitry structured to execute the example machine readable instructions of FIG. 4 to implement channel change detection-based short content identification.
Figure 8:
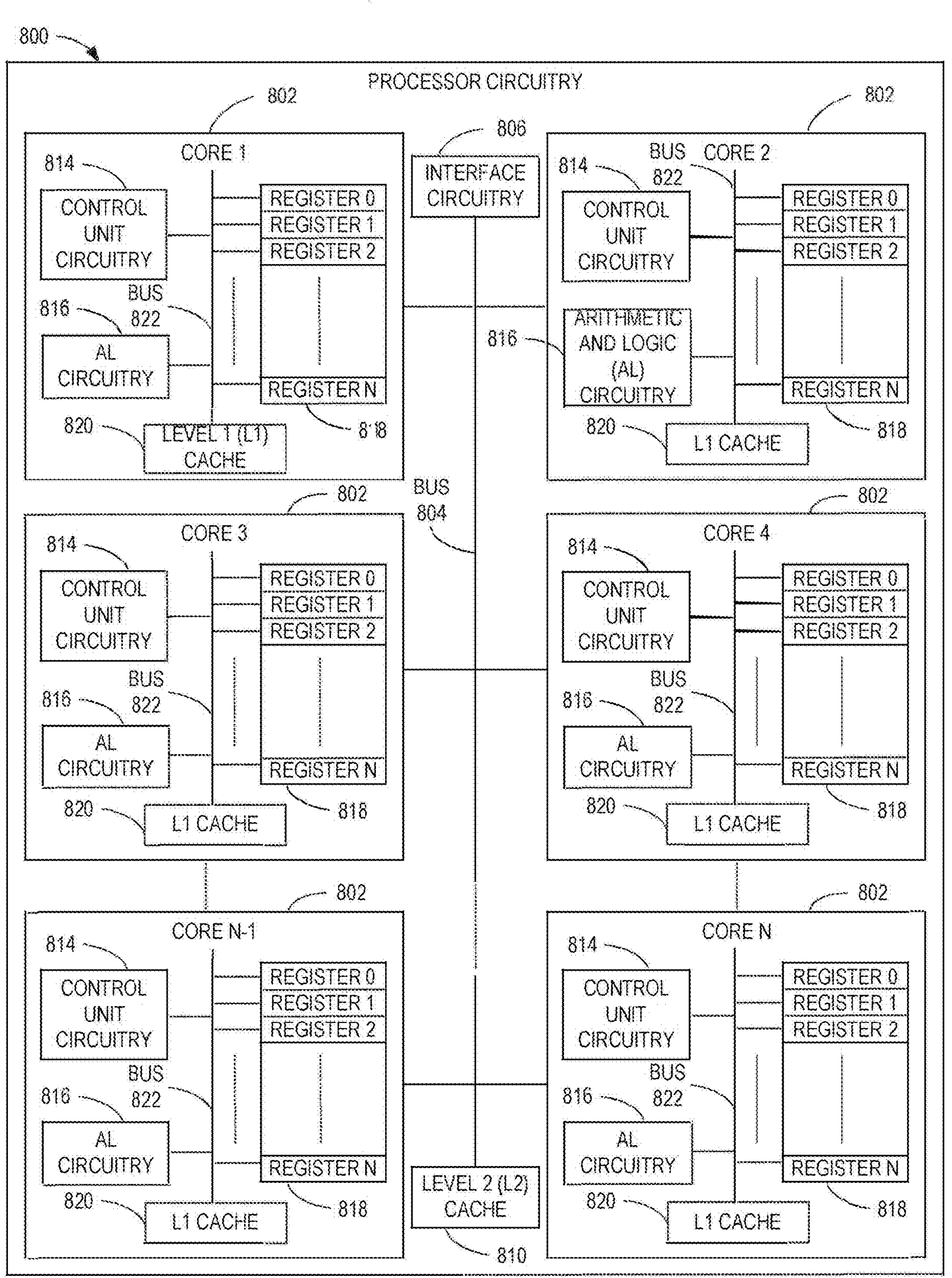
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 3-4.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C)

bus, a Serial Peripheral Interface (SPI) bus, a PCI bus, or a PCIe bus. Additionally or alternatively, the bus 804 may implement any other type of computing or electrical bus. The cores 802 may access data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
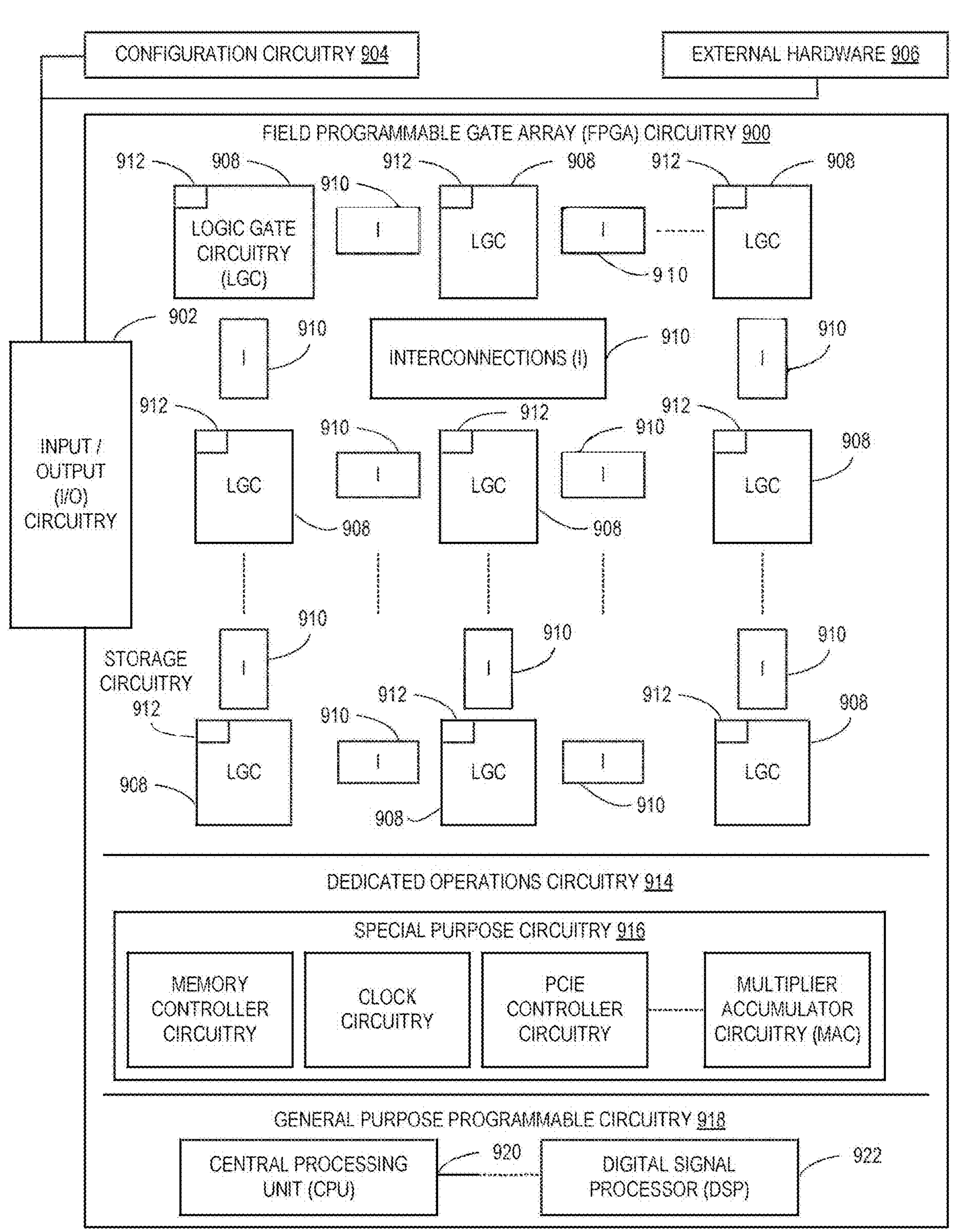
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4-6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4-6. As such, the FPGA circuitry 900 may be structured to effectively instantiate some or all of the machine readable instructions of the flowcharts of FIGS. 4-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to access and/or output data to/from example configuration circuitry 904 and/or external hardware (e.g., external hardware circuitry) 906. For example, the configuration circuitry 904 may implement interface circuitry that may access machine readable instructions to configure the FPGA circuitry 900, or portion(s) thereof. In some such examples, the configuration circuitry 904 may access the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 4-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4-6 may be executed by one or more of the cores 802 of FIG. 8 and a second portion of the machine readable instructions represented by the flowcharts of FIGS. 4-6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
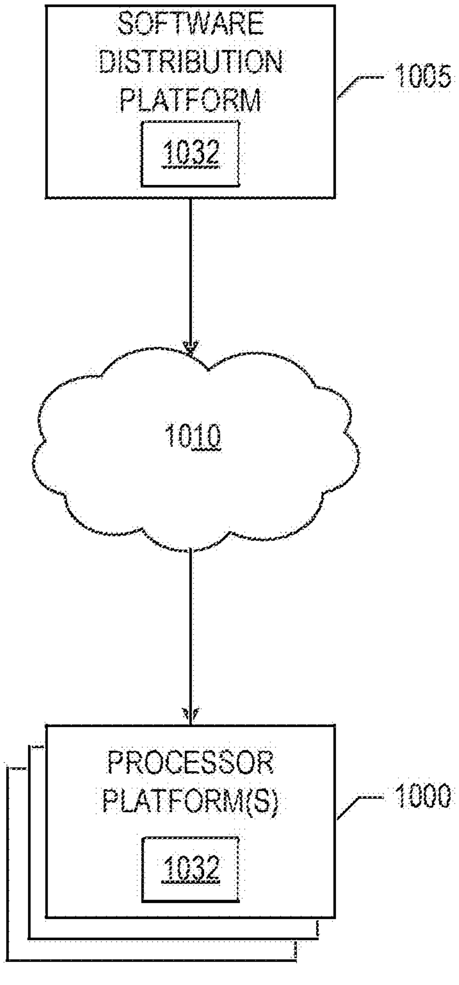
FIG. 10 is a block diagram of an example software distribution platform (e.g., one or more servers) to distribute software (e.g., software corresponding to the example machine readable instructions of FIGS. 4-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 400, 500, and 600 of FIGS. 4-6, as described above. The one or more servers of the example software distribution platform 1005 are in communication with a network 1010, which may correspond to any one or more of the Internet and/or any of the example networks 1010 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 400, 500, and 600 of FIGS. 4-6, may be downloaded to the example processor platform 1000, which is to execute the machine readable instructions 732 to implement the audio stream analyzing circuitry 324. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that improve short media content identification with channel change detection. The disclosed systems, methods, apparatus, and articles of manufacture improve the identification of short content in audio blocks by detecting channel change occurrences and realigning audio blocks to coincide with channel changes. The realignment allows audio watermarks (e.g., audio codes and audio signatures) to be extracted from audio blocks without having the codes and signatures of multiple audio channels to prevent identification. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent. Further examples and combinations thereof include the following:

Example 1 includes at least one non-transitory computer-readable storage medium comprising instructions that, when executed, cause one or more processors of a machine to at least form a first audio block from an audio stream, detect whether the first audio block contains a channel change, the first audio block being one of a plurality of audio blocks the accessed audio, determine an offset of time from a beginning of the first audio block to when the channel change occurs in response to the channel change being detected in the first audio block, and create a new audio block aligned to start at the offset of time beyond the beginning of the first audio block using audio information from the audio stream, the new audio block to include a single channel of audio stream data.

Example 2 includes the at least one non-transitory computer-readable storage medium of example 1, wherein the channel change is a first channel change, and the instructions, when executed, cause the one or more processors of the machine to at least detect a second channel change from the audio stream, and extend a length of the new audio block to the second channel change in response to the time from the first channel change to the second channel change being less than a standard audio block length.

Example 3 includes the at least one non-transitory computer-readable storage medium of example 2, wherein the new audio block is a first new audio block, and the instructions, when executed, cause the one or more processors of the machine to create a second new audio block aligned to start at a beginning of the second channel change.

Example 4 includes the at least one non-transitory computer-readable storage medium of example 1, wherein the instructions, when executed, cause the one or more processors of the machine to form the first audio block from the audio stream, the first audio block including at least an audio signature and an audio code.

Example 5 includes the at least one non-transitory computer-readable storage medium of example 4, wherein the instructions, when executed, cause the one or more processors of the machine to extract an audio code from the new audio block.

Example 6 includes the at least one non-transitory computer-readable storage medium of example 4, wherein the instructions, when executed, cause the one or more processors of the machine to identify an audio signature from the new audio block.

Example 7 includes the at least one non-transitory computer-readable storage medium of example 1, wherein the instructions, when executed, cause the one or more processors of the machine to train an artificial neural network to detect one or more additional channel changes by sending an amount of data at least including the first audio block and the offset of time to a channel change detection model.

Example 8 includes a method, comprising detecting, by executing an instruction with at least one processor, whether a first audio block contains a channel change, the first audio block being one of a plurality of audio blocks in an audio stream, determining, by executing an instruction with the at least one processor, an offset of time from a beginning of the first audio block to when the channel change occurs in response to the channel change being detected in the first audio block, and creating, by executing an instruction with the at least one processor, a new audio block aligned to start at the offset of time beyond the beginning of the first audio block using audio information from the audio stream.

Example 9 includes the method of example 8, wherein the channel change is a first channel change, and further including detecting a second channel change from the audio stream, wherein a length of the new audio block is from the first channel change to the second channel change in response to the time from the first channel change to the second channel change being less than a standard audio block length.

Example 10 includes the method of example 9, wherein the new audio block is a first new audio block, and further including creating a second new audio block aligned to start at a beginning of the second channel change.

Example 11 includes the method of example 8, further including forming the first audio block from the audio stream, the first audio block including at least an audio signature and an audio code.

Example 12 includes the method of example 11, further including extracting an audio code from the new audio block.

Example 13 includes the method of example 11, further including identifying an audio signature from the new audio block.

Example 14 includes the method of example 8, further including training an artificial neural network to detect one or more additional channel changes by sending an amount of data at least including the first audio block and the offset of time to a channel change detection model.

Example 15 includes an apparatus comprising processor circuitry including one or more of at least one of a central processor unit, a graphic processor unit or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or an Application Specific Integrate Circuitry (ASIC) including logic gate circuitry to perform one or more third operations, the processor circuitry to perform at least one of the one or more first operations, the one or more second operations or the one or more third operations to instantiate neural network channel change detector circuitry to detect whether a first audio block contains a channel change, the first audio block being one of a plurality of audio blocks in an audio stream, and determine an offset of time from a beginning of the first audio block to when the channel change occurs in response to the channel change being detected in the first audio block, and audio block creator circuitry to create a new audio block aligned to start at the offset of time beyond the beginning of the first audio block using audio information from the audio stream.

Example 16 includes the apparatus of example 15, wherein the channel change is a first channel change, and wherein the processor circuitry to perform at least one of the one or more first operations, the one or more second operations or the one or more third operations to instantiate neural network channel change detector circuitry to detect a second channel change from the audio stream, wherein a length of the new audio block is from the first channel change to the second channel change in response to the time from the first channel change to the second channel change being less than a standard audio block length.

Example 17 includes the apparatus of example 16, wherein the new audio block is a first new audio block, and wherein the processor circuitry to perform at least one of the one or more first operations, the one or more second operations or the one or more third operations to instantiate audio block creator circuitry to create a second new audio block aligned to start at a beginning of the second channel change.

Example 18 includes the apparatus of example 15, and wherein the processor circuitry to perform at least one of the one or more first operations, the one or more second operations or the one or more third operations to instantiate audio stream block formation circuitry to form the first audio block from the audio stream, the first audio block including at least an audio signature and an audio code.

Example 19 includes the apparatus of example 18, and wherein the processor circuitry to perform at least one of the one or more first operations, the one or more second operations or the one or more third operations to instantiate code and signature identification circuitry to extract an audio code from the new audio block.

Example 20 includes the apparatus of example 18, and wherein the processor circuitry to perform at least one of the one or more first operations, the one or more second operations or the one or more third operations to instantiate code and signature identification circuitry to identify an audio signature from the new audio block.

Example 21 includes the apparatus of example 15, and wherein the processor circuitry to perform at least one of the one or more first operations, the one or more second operations or the one or more third operations to instantiate neural network channel change trainer circuitry to train an artificial neural network to detect one or more additional channel changes by sending an amount of data at least including the first audio block and the offset of time to a channel change detection model.

Example 22 includes an apparatus, comprising means for detecting whether a first audio block contains a channel change, the first audio block being one of a plurality of audio blocks in an audio stream, and determine an offset of time from a beginning of the first audio block to when the channel change occurs in response to the channel change being detected in the first audio block, and means for creating a new audio block aligned to start at the offset of time beyond the beginning of the first audio block using audio information from the audio stream.

Example 23 includes the apparatus of example 22, wherein the channel change is a first channel change, the means for detecting is to detect a second channel change from the audio stream, and further including means for creating the new audio block at a length of the first channel change to the second channel change in response to the time from the first channel change to the second channel change being less than a standard audio block length.

Example 24 includes the apparatus of example 23, wherein the new audio block is a first new audio block, and the means for creating is to create a second new audio block aligned to start at a beginning of the second channel change.

Example 25 includes the apparatus of example 22, further including means for forming the first audio block from the audio stream, the first audio block including at least an audio signature and an audio code.

Example 26 includes the apparatus of example 25, further including means for identifying to extract an audio code from the new audio block.

Example 27 includes the apparatus of example 25, further including means for identifying an audio signature from the new audio block.

Example 28 includes the apparatus of example 22, further including means for training train an artificial neural network to detect one or more additional channel changes by sending an amount of data at least including the first audio block and the offset of time to a channel change detection model.

Example 29 includes an apparatus, comprising neural network channel change detector circuitry to detect whether a first audio block contains a channel change, the first audio block being one of a plurality of audio blocks in an audio stream, and determine an offset of time from a beginning of the first audio block to when the channel change occurs in response to the channel change being detected in the first audio block, and audio block creator circuitry to create a new audio block aligned to start at the offset of time beyond the beginning of the first audio block using audio information from the audio stream.

Example 30 includes the apparatus of example 29, wherein the channel change is a first channel change, wherein the neural network channel change detector circuitry is to detect a second channel change from the audio stream, and the audio block creator circuitry is to create a length of the new audio block from the first channel change to the second channel change in response to the time from the first channel change to the second channel change being less than a standard audio block length.

Example 31 includes the apparatus of example 30, wherein the new audio block is a first new audio block, wherein the audio block creator circuitry is to create a second new audio block aligned to start at a beginning of the second channel change.

Example 32 includes the apparatus of example 29, further including audio stream block formation circuitry to form the first audio block from the audio stream, the first audio block including at least an audio signature and an audio code.

Example 33 includes the apparatus of example 32, further including code and signature identification circuitry to extract an audio code from the new audio block.

Example 34 includes the apparatus of example 32, further including a code and signature identification circuitry to identify an audio signature from the new audio block.

Example 35 includes the apparatus of example 29, further including neural network channel change trainer circuitry to train an artificial neural network to detect one or more additional channel changes by sending an amount of data at least including the first audio block and the offset of time to a channel change detection model.

The following claims are hereby incorporated into this Detailed Description by this reference, with each claim standing on its own as a separate embodiment of the present disclosure.

What is claimed is:

1. A non-transitory computer readable storage medium, having stored thereon program instructions that, upon execution by a processor, cause performance of a set of operations comprising:

obtaining an audio stream including an output of a media presentation device;

segmenting the audio stream into a plurality of audio blocks each based on a respective temporal portion of the obtained audio stream;

detecting that a first audio block of the plurality of audio blocks includes a media source change;

based on detecting that the first audio block includes the media source change, creating a new audio block of the audio stream aligned to start at a time offset relative to the first audio block; and obtaining media monitoring information based on the new audio block.

2. The non-transitory computer readable storage medium of claim 1, wherein the media monitoring information is an encoded watermark, and wherein the operations further include extracting the encoded watermark from the new audio block.

3. The non-transitory computer readable storage medium of claim 1, wherein the media monitoring information is a monitoring signature, and wherein the operations further include generating the monitoring signature from the new audio block.

4. The non-transitory computer readable storage medium of claim 3, wherein the operations further include reporting, via a network gateway, the monitoring signature for comparison with reference signatures.

5. The non-transitory computer readable storage medium of claim 1, wherein the operations further include determining, in response to detecting that the first audio block includes the media source change, that the time offset relative to the first audio block is from a beginning of the first audio block to a time when the media source change occurs.

6. The non-transitory computer readable storage medium of claim 5, wherein the operations further include determining, based on an analysis of the obtained audio stream, the time when the media source change occurs.

7. The non-transitory computer readable storage medium of claim 1, wherein the media source change is a channel change of the media presentation device.

8. A device comprising:

a processor; and memory having stored thereon program instructions that, upon execution by the processor, cause performance of a set of operations comprising:

obtaining an audio stream including an output of a media presentation device;

segmenting the audio stream into a plurality of audio blocks each based on a respective temporal portion of the obtained audio stream;

detecting that a first audio block of the plurality of audio blocks includes a media source change;

based on detecting that the first audio block includes the media source change, creating a new audio block of the audio stream aligned to start at a time offset relative to the first audio block; and obtaining media monitoring information based on the new audio block.

9. The device of claim 8, wherein the media monitoring information is an encoded watermark, and wherein the operations further include extracting the encoded watermark from the new audio block.

10. The device of claim 8, wherein the media monitoring information is a monitoring signature, and wherein the operations further include generating the monitoring signature from the new audio block.

11. The device of claim 10, further comprising a network gateway, and wherein the operations further include reporting, via the network gateway, the monitoring signature for comparison with reference signatures.

12. The device of claim 8, wherein the operations further include determining, in response to detecting that the first audio block includes the media source change, that the time offset relative to the first audio block is from a beginning of the first audio block to a time when the media source change occurs.

13. The device of claim 12, wherein the operations further include determining, based on an analysis of the obtained audio stream, the time when the media source change occurs.

14. A method comprising:

obtaining an audio stream including an output of a media presentation device;

segmenting the audio stream into a plurality of audio blocks each based on a respective temporal portion of the obtained audio stream;

detecting that a first audio block of the plurality of audio blocks includes a media source change;

based on detecting that the first audio block includes the media source change, creating a new audio block of the audio stream aligned to start at a time offset relative to the first audio block; and obtaining media monitoring information based on the new audio block.

15. The method of claim 14, wherein the media monitoring information is an encoded watermark, the method further including extracting the encoded watermark from the new audio block.

16. The method of claim 14, wherein the media monitoring information is a monitoring signature, the method further including generating the monitoring signature from the new audio block.

17. The method of claim 16, further including reporting, via a network gateway, the monitoring signature for comparison with reference signatures.

18. The method of claim 14, further including determining, in response to detecting that the first audio block includes the media source change, that the time offset relative to the first audio block is from a beginning of the first audio block to a time when the media source change occurs.

19. The method of claim 18, further including determining, based on an analysis of the obtained audio stream, the time when the media source change occurs.

20. The method of claim 14, wherein the media source change is a channel change of the media presentation device.

* * * * *